(12) United States Patent
Pallardy

(10) Patent No.: US 12,743,329 B2
(45) Date of Patent: Sep. 22, 2026

(54) METHOD FOR MANAGING THE ISOLATION OF RESOURCES OF A SYSTEM-ON-CHIP, AND CORRESPONDING SYSTEM-ON-CHIP

(71) Applicant: STMicroelectronics (Grand Ouest) SAS, Le Mans (FR)

(72) Inventor: Loic Pallardy, Rouillon (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 172 days.

(21) Appl. No.: 18/514,812

(22) Filed: Nov. 20, 2023

(65) Prior Publication Data

US 2024/0176689 A1 May 30, 2024

(30) Foreign Application Priority Data

Nov. 25, 2022 (FR) ...................................... 2212348

(51) Int. Cl.
*G06F 11/00* (2006.01)
*G06F 11/07* (2006.01)

(52) U.S. Cl.
CPC ...... *G06F 11/0772* (2013.01); *G06F 11/0745* (2013.01)

(58) Field of Classification Search
CPC ............. G06F 11/0772; G06F 11/0745; G06F 11/327; G06F 11/305
See application file for complete search history.

(56) References Cited

U.S. PATENT DOCUMENTS 8,719,925 B1 * 5/2014 Berg ...................... G06F 21/554 726/22
9,268,970 B2 * 2/2016 Grafton ................... G06F 21/74
9,787,531 B2 * 10/2017 Floyd, III ........... H04L 41/0695
2004/0098521 A1 * 5/2004 Lin ....................... G06F 13/126 710/72
2015/0106490 A1 * 4/2015 Floyd, III ........... H04L 41/0659 709/223
2015/0269396 A1 9/2015 Grafton
2021/0312091 A1 10/2021 Dafali et al.
2023/0291645 A1 9/2023 Anquet et al.
2024/0176863 A1 * 5/2024 Cheruel .................. G06F 21/44

FOREIGN PATENT DOCUMENTS

CN 115357926 A 11/2022
FR 3103586 A1 5/2021

OTHER PUBLICATIONS

The PCI Express Advanced Error Reporting Driver Guide HOWTO, https://docs.kernel.org/PCI/pcieaer-howto.html (Year: 2006).*

* cited by examiner

*Primary Examiner* — Charles Ehne
(74) *Attorney, Agent, or Firm* — Slater Matsil, LLP

(57) ABSTRACT

The system-on-chip includes at least one master device, at least one slave resource, an interconnection bus including an error notification channel, and a resource isolation system including, for each resource, a protection circuit configured to block or transmit transactions addressed to the resource via the interconnection bus, according to access rights of the resource and the transaction. The protection circuit is capable of generating a notification signal on the error notification channel of the interconnection bus in case of blockage of a transaction.

20 Claims, 3 Drawing Sheets

[Fig. 1]
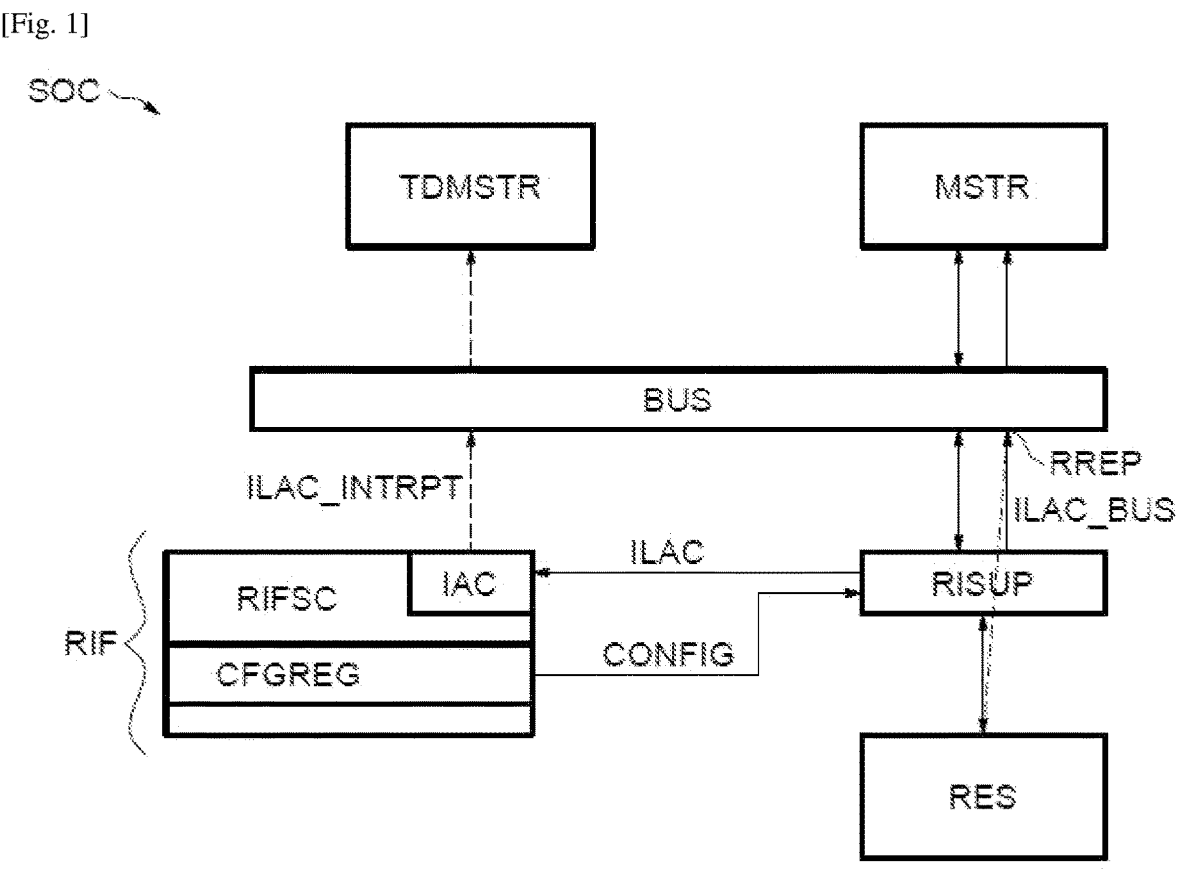
[Fig 2]
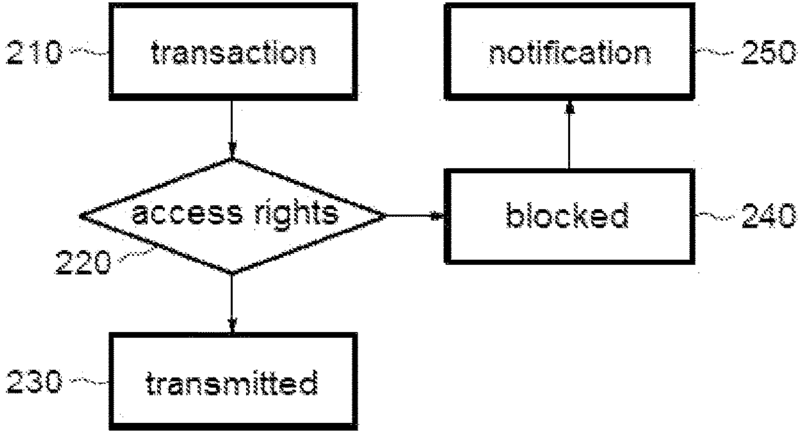

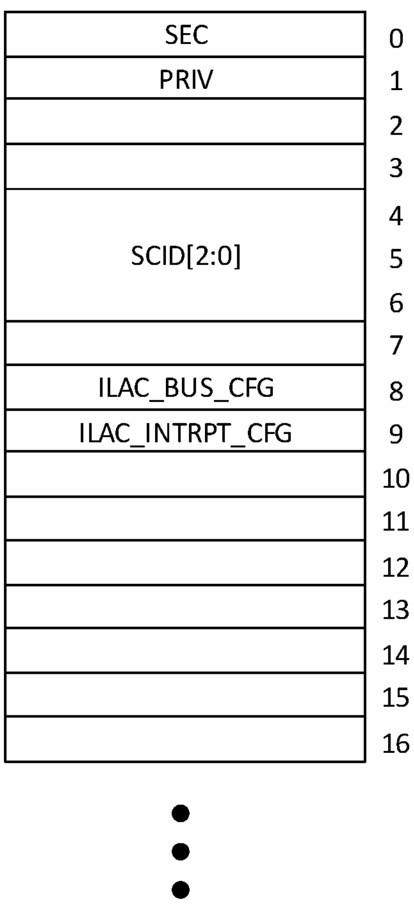
FIG. 3

| | CONFIGURATION PER RESOURCE | |
|---|---|---|
| DEGREE OF ACCURACY OF THE ILLEGAL ACCESS NOTIFICATIONS | ILAC_INTRPT_CFG | ILAC_BUS_CFG |
| 1 – (SILENCE) | 0 | 0 |
| 2 – (NOTIFICATION ONLY TO TDMSTR) | 1 | 0 |
| 3 – (NOTIFICATION ONLY TO FAULTY MSTR) | 0 | 1 |
| 4 – (NOTIFICATION TO TDMSTR AND TO FAULTY MSTR) | 1 | 1 |

FIG. 4

METHOD FOR MANAGING THE ISOLATION OF RESOURCES OF A SYSTEM-ON-CHIP, AND CORRESPONDING SYSTEM-ON-CHIP

CROSS-REFERENCE TO RELATED APPLICATIONS

This application claims the priority benefit of French patent application number 2212348, filed on Nov. 25, 2022, entitled "METHOD FOR MANAGING THE RESOURCE ISOLATION IN A SYSTEM-ON-CHIP, AND CORRESPONDING SYSTEM-ON-CHIP," which is hereby incorporated by reference herein in its entirety.

TECHNICAL FIELD

Implementations and embodiments of the invention relate to integrated circuits, in particular systems-on-chip, for example, a microcontroller or a microprocessor, and more particularly techniques for isolating resources belonging to the system-on-chip.

BACKGROUND

To guarantee the reliability of a system-on-chip, resource isolation techniques allow restricting access of one or more master (i.e., primary) device(s) to specific slave (i.e., auxiliary) resources. We talk about "illegal" access when a transaction, emitted by a master device towards a slave (i.e., auxiliary) resource, is not compliant with the established access restrictions.

For example, the publication FR 3103586 A1 (28.05.2021) describes a technique for managing these access restrictions that is simple to set up and implement, in particular when this management is dynamic, i.e. it depends on different applications of the system-on-chip.

In conventional resource isolation techniques, typically only one "trusted domain," usually in charge of managing restrictions and access rights, is informed on illegal access to a resource, by a mechanism for managing illegal accesses.

Thus, the detections of illegal accesses are typically silent, from the perspective of the device having emitted the transaction at the origin, because an illegal write access is typically ignored, and an illegal right access typically receives a "0" which can be read as read content.

This may result in difficulties during debugging, since it is possible to know which resource has been illegally accessed, but not through which context (i.e., by which master device or access rights).

In addition, in some products, it could be desirable to immediately stop a defective master device, which is conventionally impossible without delay because the trusted domain should first process the error before deciding what should be done.

Finally, when the defective master device is not informed of the error, it could repeat the same error and might destabilize the system, for example by accumulating improper configurations in registers. In some situations, this behavior may be unacceptable.

SUMMARY

Thus, there is a need to overcome the aforementioned problems, in particular, provide a solution allowing immediately notifying the master device concerned by the illegal access error, and identifying the context, and possibly the code line, that has generated the illegal access error.

Furthermore, there is a need for the illegal access management solutions being able to be set, for example, by a user, in particular in order to configure the degree of accuracy in the manner in which a detection of an illegal access is notified.

In this respect, embodiments and implementations suggest generating a notification signal, in case of illegal access, directly transmitted to the concerned master device on an error notification channel of an interconnection bus of the system-on-chip.

Furthermore, embodiments and implementations provide for selecting the behavior for each resource in order to decide whether an illegal access should be silent or cause the generation of the notification signal.

Thus, according to one aspect, a system-on-chip is provided including at least one master device, at least one slave resource, an interconnection bus including an error notification channel, and a resource isolation system including, for each resource, a protection circuit configured to block or transmit transactions addressed to the resource via the interconnection bus, according to access rights of the resource and the transaction. The protection circuit is capable of generating a notification signal on the error notification channel of the interconnection bus in case of blockage of a transaction.

For example, the protection circuit is configured to address said notification signal to the master device at the origin of said blocked transaction.

For example, the interconnection bus is a system coupled between the master devices and the slave resources which allows routing transactions, for example, write or read transactions, between the master devices and the slave resources.

For example, the notification signal communicated on the error notification channel of the interconnection bus may be intended to generate a reaction, advantageously immediate, of the master device at the origin of the blocked transaction.

The reaction of the master device may comprise an interruption of the ongoing data transfer, or a stoppage of an ongoing process (at the origin of the illegal access) by forcing a generation of a data abort exception.

Advantageously, the reaction of the master device may allow recovering the address that has caused the illegal access. In particular, the forced generation of the data abort exception can, indeed, allow identifying the address that has generated the data abort exception. For example, data abort management processes may usually be provided for respective access right levels (for example, non-secure and secure).

The use (or the reuse) of the existing error notification channel on the interconnection bus by the protection circuit, also allows for avoiding multiplying the connecting wires dedicated to the resource isolation system. In particular, it should be noted that it is the protection circuit that is capable of using said error notification channel of the bus, and not the resource. Indeed, it is actually in case of blockage of a transaction, and therefore for a resource completely ignoring the existence of this transaction, that the protection circuit is capable of generating a notification signal on the error notification channel of the bus. Thus, the error notification channel of the bus is, for example, "overloaded" by the protection circuit, in addition to the resource, because the protection circuit is capable of using this channel independently of the resource, while this channel could normally be intended to be used by the resource independently of the protection circuit.

According to one embodiment, the resource isolation system includes, in a set of configuration registers, for each resource a location for containing a setting data of the notifications, the protection circuit of each resource is configured to generate, or not, said notification signal in case of blockage of a transaction addressed to the resource, according to the setting data of the notifications for this resource.

Thus, the additional degree of accuracy in detecting illegal accesses, obtained by the notification signal on the error notification channel of the bus, may be activated or deactivated according to needs in terms of resource isolation, for example, selected by a user. Indeed, for each resource and according to the use of a product, it could be desirable to benefit from great control and high security and thus activate the notification signal in case of blockage of a transaction; or conversely, favor simplicity or performance and deactivate this signal in order not to use the error notification channel of the bus or interrupt the master device.

According to one embodiment, the system-on-chip includes a trusted master device, and the resource isolation system includes a central management unit capable of generating an interruption signal addressed to the trusted master device, in case of blockage of a transaction by any one of said at least one protection circuit.

Indeed, the use of the notification signal on the error notification channel of the interconnection bus is compatible in combination with central management of illegal accesses using an interruption transmitted to the trusted master device.

According to one embodiment, the resource isolation system includes, in a set of configuration registers, for each resource, a location intended to contain a setting data of the interruptions, the central management unit is configured to generate, or not, said interruption signal in case of blockage of a transaction addressed to a resource, according to the setting data of the interruptions for this resource.

Thus, herein again, the interruption signal may be activated or deactivated according to needs in terms of resource isolation, for example, selected by a user.

And, in combination with the setting data of the notifications, the system-on-chip may include four levels of accuracy in detecting illegal accesses, which can be selected, for example by a user, according to needs in terms of resource isolation.

According to another aspect, a method is provided for managing the resource isolation of a system-on-chip, wherein: the system-on-chip comprises at least one master device, at least one slave resource, and an interaction bus including an error notification channel; and the method comprises, for each resource, an implementation of protection comprising a blockage or a transmission of transactions addressed to the resource via the interconnection bus, according to access rights of the resource and the transaction, and a generation of a notification signal on the error notification channel of the interconnection bus in case of blockage of a transaction.

According to one implementation, said notification signal is addressed to the master device at the origin of said blocked transaction.

According to one implementation, a setting data of the notifications, for each resource, is contained in a set of configuration registers, and said notification signal is generated, or not, in case of blockage of a transaction addressed to a resource according to the setting data of the notifications for this resource.

According to one implementation, the system-on-chip includes a trusted master device, and the method comprises a generation of an interruption signal addressed to the trusted master device, in case of blockage of a transaction addressed to any one of said at least one resource.

According to one implementation, for each resource, a setting data of the interruptions is contained in a set of configuration registers and said interruption signal is generated, or not, in case of blockage of a transaction addressed to a resource according to the setting data of the interruptions for this resource.

BRIEF DESCRIPTION OF THE DRAWINGS

Other advantages and features of the invention will become apparent upon examining the detailed description of non-limiting embodiments and implementations, and from the accompanying drawings, in which figures:

FIG. 1 is a block diagram of an embodiment of a system-on-chip;

FIG. 2 is a flow chart of an embodiment method;

FIG. 3 is an example of a configuration register; and

FIG. 4 is a table showing the possibilities of selections of the degree of accuracy in the illegal access notifications.

DETAILED DESCRIPTION OF EMBODIMENTS

FIG. 1 schematically illustrates an embodiment of a system-on-chip SOC, such as a microcontroller or a microprocessor, including at least one master (i.e., primary) device MSTR, and at least one slave (i.e., auxiliary) resource RES capable of communicating via an interconnection bus BUS.

For example, the master devices TDMSTR, MSTR may consist of processors or central processing units "CPU" (standing for "Central Processing Unit"), adapted to implemented software functions, or other master devices such as means for direct memory access "DMA" (standing for "Direct Memory Access").

In this example, the system-on-chip SOC further includes a so-called "trusted" master device TDMSTR, in particular in charge of the configuration and management of access rights defining the isolation rules, set up by a resource isolation system RIF described in more detail hereinafter.

For example, the resources may comprise an I2C-type (standing for "Inter-Integrated Circuit") or SPI-type (standing for "Serial Peripheral Interface"), UART-type (standing for "Universal Asynchronous Receiver Transmitter"), real-time clock "RTC" type (standing for "Real Time Clock") peripheral, or of the memory type such as an internal memory of the system-on-chip or an interface for a memory external to the system-on-chip.

The interconnection bus BUS is coupled between the master devices and the slave resources and allows routing transactions, for example, write or read transactions, and more generally information, on channels possibly having dedicated functions, between the master devices MSTR and the slave resources RES.

For example, the interconnection bus may be an "AXI" type, standing for "Advanced extensible Interface," or "AHB" type, standing for "Advanced High-performance Bus," bus which are "AMBA" type, standing for "Advanced Microcontroller Bus Architecture" microcontroller bus types.

In particular, the interconnection bus BUS includes an error notification channel RREP, for example, intended to communicate response information of the slave resources, following a reception of a read or write transaction. For example, the response information may be encoded over 2 bits, so as to enable a communication of 4 different states.

For example, one of the possible information RREP may be intended to communicate an error notification by a slave resource, in the case where a transaction has been successfully received but not understood by the slave resource.

The system-on-chip SOC includes a resource isolation system RIF configured to restrict access of one or more master device(s) to specific slave resources, in particular, according to access rights defined in this respect.

For example, amongst the access rights that could define the resource isolation rules, one could provide for defining favored and non-favored environments, and possibly cumulatively secure and non-secure environments, possibly as well as a compartmentalization identifier.

The concepts of environments and secure/non-secure and favored/non-favored access rights are well known to a person skilled in the art, and the notions of compartmentalization identifier are taught in particular in the publication FR 3103586 A1 (28.05.2021). We talk about “illegal” access when the access rights of a transaction are not compliant with those of the addressee resource.

For example, the resource isolation system RIF of the system-on-chip may be incorporated in the resource isolation technique described in the publication FR 3103586 A1 (28.05.2021). In particular, the resource isolation system RIF includes for each resource RES, a protection circuit RISUP (sometimes called “firewall”), configured to block or transmit transactions addressed to the resource RES via the interconnection bus BUS, according to said access rights of the resource and the transaction.

Furthermore, according to a general feature of the present description, the protection circuit RISUP can generate a notification signal ILAC_BUS on the error notification channel RREP of the interconnection bus BUS, in case of blockage of a transaction.

In this respect, reference is made to FIG. 2. FIG. 2 illustrates the method 200 implemented by the protection circuit RISUP, in the resource isolation management RIF of the system-on-chip SOC described with reference to FIG. 1.

Thus, the implementation of the protection 200 of each resource, comprises, upon reception 210 of a transaction originating from the interconnection bus BUS, a verification 220 of the access rights of this transaction regarding the access rights of the resource.

Depending on the verification 220, the transaction 210 may be transmitted 230 to the resource RES downstream, or blocked 240 by the protection circuit RISUP upstream. And, if the transaction is blocked 240, the notification signal ILAC_BUS is generated 250 on the error notification channel RREP of the interconnection bus BUS, by the protection circuit RISUP.

Reference is made again to FIG. 1. Advantageously, the notification signal ILAC_BUS is addressed to the master device MSTR at the origin of said blocked transaction, by the routing mechanisms of the bus.

For example, the notification signal may, in this respect, consist of the aforementioned information, intended to communicate on the error notification channel RREP an error notification of the slave resource, where the transaction has been successfully received.

It should be noted that, in this example, the error notification channel RREP of the bus is normally intended to be used by the resource RES (as represented by the arrow in the dotted line), and not by the protection circuit RISUP itself. Yet, in this case, it is actually the protection circuit RISUP itself that generates the notification signal ILAC_BUS on the error notification channel of the bus BUS. Indeed, in the case of blockage 240 of the transaction, the resource RES is not informed of the existence of this transaction and therefore cannot generate the notification signal ILAC_BUS.

Thus, the error notification channel of the bus RREP is said “overloaded” since it is connected and can be used independently by two distinct circuits, both by the protection circuit RISUP and by the resource RES. In particular, the use, or the “reuse,” of the error notification channel RREP of the interconnection bus BUS by the protection circuit RISUP, allows for avoiding introducing additional connecting wires for the resource isolation system RIF.

Moreover, the notification signal ILAC_BUS may be intended to generate a reaction, advantageously immediate, of the master device MSTR at the origin of the blocked transaction.

The reaction of the master device MSTR may comprise an interruption of the ongoing data transfer or a stoppage of the ongoing process (at the origin of the illegal access) by forcing a generation of a data abort exception. Advantageously, the forced generation of the data abort exception allows identifying the address that has generated it, thus allowing identifying the address that has generated the illegal access. For example, data abort management processes may usually be provided for respective access right levels (for example, non-secure and secure).

Besides, the resource isolation system RIF may be configured to concomitantly generate an interruption signal ILAC_INTRPT addressed to the trusted master device TRMSTR in case of blockage of a transaction by any one of the protection circuits RISUP of the different peripherals (at least one) of the system-on-chip SOC.

For example, the interruption signal ILAC_INTRPT may be communicated to the trusted master device TDMSTR by the routing mechanism of the interconnection bus BUS.

In this respect, the resource isolation system RIF may include a central unit for managing illegal access IAC, for example within a control device of the resource isolation system RIFSC.

In this case, the protection circuits RISUP of the resources RES are configured to generate a detection signal of an illegal access ILAC (or of the blockage of the corresponding transaction) and communicate it to the central unit for managing illegal accesses IAC.

In turn, the central unit for managing illegal accesses IAC is configured to generate the interruption ILAC_INTRPT addressed to the trusted master device TDMSTR, in case of reception of an illegal access detection signal ILAC communicated by any one of the protection circuits RISUP.

Moreover, the resource isolation system RIF may advantageously include configuration registers CFGREG, for example within the control device of the resource isolation system RIFSC, capable of containing configuration information CONFIG of the elements of the resource isolation system RIF (in particular the protection circuits RISUP and the central management unit IAC).

In this respect, reference is made to FIG. 3

FIG. 3 illustrates an example of a configuration register CFGREG_RESy, respectively dedicated to a resource “RESy” of the system-on-chip SOC.

The configuration register CFGREG_RESy contains 32 locations “0” to “31” for containing setting data relating to the isolation of the resources, for the respective resource RES.

For example and arbitrarily, the location “0” may allow defining the secure or non-secure access right SEC of the resource whereas the location “1” may allow defining the favored or non-favored access right PRIV of the resource.

Also, for example, the locations "4" to "6" may allow containing the compartmentalization identifier of the resource.

In an advantageous embodiment of the resource isolation system RIF, the configuration register CFGREG_RESy contains a location "8" intended to contain a setting data of the notifications ILAC_BUS_CFG.

The setting data of the notifications ILAC_BUS_CFG allows activating or deactivating (for example when it is stored at the value "1," or respectively "0") the illegal access notification ILAC_BUS function via the error notification channel RREP of the interconnection bus BUS.

For example, the value of the setting data of the notifications ILAC_BUS_CFG may be stored by a user in order to select the degree of accuracy of illegal access notifications he wishes to benefit from, and also selectively for each resource RES of the system-on-chip SOC.

For example, the value of the setting data of the notifications ILAC_BUS_CFG may also be stored through an access right set-up procedure, usually performed by the trusted master device TDMSTR upon start-up of the system-on-chip SOC.

Thus, the operation of the protection circuit RISUP of each resource RES is configured according to the setting data ILAC_BUS_CFG contained in the respective location "8" of the configuration register.

In this respect, the protection circuit RISUP is configured to generate the notification signal ILAC_BUS in case of blockage of a transaction addressed to the resource, if the setting data of the notifications ILAC_BUS_CFG for this resource is activated (for example at "1"), and not to generate the notification signal ILAC_BUS if the setting data of the notifications ILAC_BUS_CFG for this resource is deactivated (for example at "0").

Furthermore, in the case where the resource isolation system RIF includes the central unit for managing illegal access IAC, as mentioned before, the configuration register CFGREG_RESy may advantageously contain a location "9" intended to contain a setting data of the interruptions ILAC_INTRPT_CFG.

The setting data of the interruptions ILAC_INTRPT_CFG allows activating or deactivating (for example when it is stored at the value "1," or respectively "0") the function of the central unit for managing illegal accesses IAC generating interruptions ILAC_INTRPT to the trusted master device TDMSTR, in case of an illegal access detection, and respectively for each one of the resources RES.

For example, the value of the setting data of the interruptions ILAC_INTRPT_CFG may be stored by a user, herein again in order to select the degree of accuracy of illegal access notification from which he wishes to benefit, and furthermore selectively for each resource RES of the system-on-chip SOC.

Thus, the operation of the central unit for managing illegal accesses IAC is specifically configured for each resource RES according to the setting data ILAC_INTRPT_CFG contained in the respective location "9" of the configuration register.

In this respect, the central unit for managing illegal accesses IAC is configured for each resource, so as to generate the interruption signal ILAC_INTRPT in case of blockage of a transaction addressed to the resource, if the setting data of the interruptions ILAC_INTRPT_CFG for this resource is activated (for example at "1"); and not to generate the interruption signal ILAC_INTRPT if the setting data of the interruptions ILAC_INTRPT_CFG for this resource is deactivated (for example at "0").

FIG. 4 illustrates a table showing the possibilities of selections of the degree of accuracy in the illegal access notifications, of an embodiment of the system-on-chip SOC previously described with reference to FIGS. 1 to 3.

The different degrees of accuracy of the illegal access notifications are defined respectively for each resource, by the configuration of the setting data of the notifications ILAC_BUS_CFG and the setting data of the interruptions ILAC_INTRPT_CFG.

The four degrees of accuracy of the illegal access notifications are designated according to the increasing order by the numbers 1, 2, 3, 4.

The first degree "1" corresponds to silence in case of illegal access and is defined by the deactivation of the interruption function of the trusted master device TDMSTR, ILAC_INTRPT_CFG=0, and by the deactivation of the notification function of the faulty master device MSTR (i.e. the master device having generated the transaction at the origin of the illegal access), ILAC_BUS_CFG=0.

The second degree "2" corresponds to a notification to only the trusted master device TDMSTR and is defined by the activation of the interruption function of the trusted master device TDMSTR, "ILAC_INTRPT_CFG=1," and by the deactivation of the notification function of the faulty master device MSTR, "ILAC_BUS_CFG=0".

The third degree "3" corresponds to a notification only to the faulty master device MSTR and is defined by the deactivation of the interruption function of the trusted master device TDMSTR, "ILAC_INTRPT_CFG=0," and by the activation of the notification function of the faulty master device MSTR, "ILAC_BUS_CFG=1".

The fourth degree "4" corresponds to a notification to both the trusted master device TDMSTR and to the faulty master device MSTR, and is defined by the activation of the interruption function of the trusted master device TDMSTR, "ILAC_INTRPT_CFG=1," and by the activation of the notification function of the faulty master device MSTR, "ILAC_BUS_CFG=1".

To sum up, the particular advantageous degree of accuracy in the detection of illegal accesses, obtained by the notification signal ILAC_BUS on the error notification channel of the bus RREP, may be activated or deactivated according to needs in terms of resource isolation, for example, selected by a user.

Advantageously, this selection may also be done concomitantly with the configuration of the interruption signal ILAC_INTRPT, without generating information redundancy.

The selection of the configuration of the degree of accuracy of the illegal access notifications may be done dynamically during the use of the system-on-chip, for example at the maximum level of accuracy during the design or debugging phase of a program using the resources of the system-on-chip SOC, and at a lower level during the final use of the system-on-chip SOC.

More generally, it is possible to benefit from great control and high security or to favor simplicity or performance, according to the function of the resource and dynamically according to the use of the system-on-chip and its resources.

What is claimed is:

1. A system-on-chip (SoC), comprising:

a primary circuit;

an auxiliary resource;

an interconnection bus comprising an error notification channel, the interconnection bus configured to couple the primary circuit to the auxiliary resource; and a resource isolation system comprising a protection circuit for the auxiliary resource, the protection circuit configured to:

transmit or block a transaction addressed to the auxiliary resource via the interconnection bus based on a comparison of security domain attributes of the transaction against security domain attributes stored in a per-resource configuration register associated with the auxiliary resource as access rights of the auxiliary resource, and generate, on the error notification channel, by the protection circuit independently of the auxiliary resource, a notification signal addressed to the primary circuit via routing mechanisms of the interconnection bus in response to the protection circuit blocking the transaction.

2. The SoC of claim 1, wherein the transaction being blocked originates from the primary circuit, and wherein the protection circuit is configured to address the notification signal to the primary circuit.

3. The SoC of claim 1, wherein the resource isolation system comprises, for the auxiliary resource, a set of configuration resources to contain setting data for notifications, the protection circuit configured to generate the notification signal in response to blockage of the transaction addressed to the auxiliary resource in accordance with the setting data of the notification for the auxiliary resource.

4. The SoC of claim 1, further comprising a trusted primary circuit coupled to the interconnection bus, the resource isolation system comprising a central management unit, the central management unit configured to generate an interruption signal addressed to the trusted primary circuit in response to blockage of the transaction by the protection circuit.

5. The SoC of claim 4, wherein the resource isolation system comprises, for the auxiliary resource, a set of configuration registers to contain setting data for interrupts, the central management unit configured to generate the interruption signal in response to blockage of the transaction addressed to the auxiliary resource in accordance with the setting data for interrupts.

6. The SoC of claim 1, wherein the resource isolation system comprises, for the auxiliary resource, a set of configuration resources to contain setting data for notifications and a set of configuration registers to contain setting data for interrupts.

7. The SoC of claim 6, further comprising a trusted primary circuit coupled to the interconnection bus, the resource isolation system comprising a central management unit, the central management unit configured to generate an interruption signal addressed to the trusted primary circuit in response to blockage of the transaction by the protection circuit, and wherein the protection circuit is configured to generate the notification signal in response to blockage of the transaction addressed to the auxiliary resource in accordance with the setting data of the notifications for the auxiliary resource.

8. A method, comprising:

transmitting or blocking, by a protection circuit of a resource isolation system in a system-on-chip (SoC), a transaction addressed to an auxiliary resource of the SoC via an interconnection bus of the SoC based on a comparison of security domain attributes of the transaction against security domain attributes stored in a per-resource configuration register associated with the auxiliary resource as access rights of the auxiliary resource, the SoC further comprising a primary circuit coupled to the auxiliary resource via the interconnection bus, the protection circuit associated with the auxiliary resource; and generating, on an error notification channel of the interconnection bus by the protection circuit independently of the auxiliary resource, a notification signal addressed to the primary circuit via routing mechanisms of the interconnection bus in response to the protection circuit blocking the transaction.

9. The method of claim 8, wherein the transaction being blocked originates from the primary circuit, the method further comprising addressing, by the protection circuit, the notification signal to the primary circuit.

10. The method of claim 8, wherein the resource isolation system comprises, for the auxiliary resource, a set of configuration resources to contain setting data for notifications, the method further comprising generating, by the protection circuit, the notification signal in response to blockage of the transaction addressed to the auxiliary resource in accordance with the setting data of the notification for the auxiliary resource.

11. The method of claim 8, wherein the SoC further comprises a trusted primary circuit coupled to the interconnection bus, the resource isolation system further comprising a central management unit, the method further comprising generating, by the central management unit, an interruption signal addressed to the trusted primary circuit in response to blockage of the transaction by the protection circuit.

12. The method of claim 11, wherein the resource isolation system comprises, for the auxiliary resource, a set of configuration registers to contain setting data for interrupts, the method further comprising generating, by the central management unit, the interruption signal in response to blockage of the transaction addressed to the auxiliary resource in accordance with the setting data for interrupts.

13. The method of claim 8, wherein the resource isolation system comprises, for the auxiliary resource, a set of configuration resources to contain setting data for notifications and a set of configuration registers to contain setting data for interrupts.

14. The method of claim 13, wherein the SoC further comprises a trusted primary circuit coupled to the interconnection bus, the resource isolation system further comprises a central management unit, the method further comprising:

generating, by the central management unit, an interruption signal addressed to the trusted primary circuit in response to blockage of the transaction by the protection circuit; and generating, by the protection circuit, the notification signal in response to blockage of the transaction addressed to the auxiliary resource in accordance with the setting data of the notifications for the auxiliary resource.

15. A device comprising a system-on-chip (SoC), the SoC comprising:

an auxiliary resource;

an interconnection bus comprising an error notification channel, the interconnection bus coupled to the auxiliary resource; and a resource isolation system comprising a protection circuit for the auxiliary resource, the protection circuit configured to:

transmit or block a transaction addressed to the auxiliary resource via the interconnection bus based on a comparison of security domain attributes of the transaction against security domain attributes stored in a per-resource configuration register associated with the auxiliary resource as access rights of the auxiliary resource, and generate, on the error notification channel, by the protection circuit independently of the auxiliary resource, a notification signal addressed to a primary circuit coupled to the auxiliary resource via routing mechanisms of the interconnection bus in response to the protection circuit blocking the transaction.

16. The device of claim 15, further comprising a primary circuit coupled to the auxiliary resource via the interconnection bus, wherein the transaction being blocked originates from the primary circuit, and wherein the protection circuit is configured to address the notification signal to the primary circuit.

17. The device of claim 15, wherein the resource isolation system comprises, for the auxiliary resource, a set of configuration resources to contain setting data for notifications, the protection circuit configured to generate the notification signal in response to blockage of the transaction addressed to the auxiliary resource in accordance with the setting data of the notification for the auxiliary resource.

18. The device of claim 15, wherein the primary circuit is a trusted primary circuit, wherein the SoC further comprises the trusted primary circuit coupled to the interconnection bus, the resource isolation system comprising a central management unit, the central management unit configured to generate an interruption signal addressed to the trusted primary circuit in response to blockage of the transaction by the protection circuit.

19. The device of claim 18, wherein the resource isolation system comprises, for the auxiliary resource, a set of configuration registers to contain setting data for interrupts, the central management unit configured to generate the interruption signal in response to blockage of the transaction addressed to the auxiliary resource in accordance with the setting data for interrupts.

20. The device of claim 15, wherein the primary circuit is a trusted primary circuit, wherein the SoC further comprises the trusted primary circuit coupled to the interconnection bus, the resource isolation system comprising a central management unit, wherein the resource isolation system comprises, for the auxiliary resource, a set of configuration resources to contain setting data for notifications and a set of configuration registers to contain setting data for interrupts, wherein the protection circuit is configured to generate the notification signal in response to blockage of the transaction addressed to the auxiliary resource in accordance with the setting data of the notification for the auxiliary resource, and wherein the central management unit is configured to generate an interruption signal addressed to the trusted primary circuit in response to blockage of the transaction by the protection circuit.

* * * * *